US012444255B2

(12) United States Patent
Hogg et al.

(10) Patent No.: US 12,444,255 B2
(45) Date of Patent: Oct. 14, 2025

(54) SMART IOT END DEVICES SUPERVISED BY A GATEWAY DEVICE AND SECURE METHODS OF OPERATION

(71) Applicant: WILLOWMORE PTE. LTD., Singapore (SG)

(72) Inventors: Alan Hogg, Singapore (SG); Joseph Choon Koon Tey, Singapore (SG); Basil Edward Byrne, Singapore (SG)

(*) Notice: Subject to any disclaimer, the term of this patent is extended or adjusted under 35 U.S.C. 154(b) by 177 days.

(21) Appl. No.: 18/041,407

(22) PCT Filed: Aug. 9, 2021

(86) PCT No.: PCT/SG2021/050465
§ 371 (c)(1),
(2) Date: Feb. 12, 2023

(87) PCT Pub. No.: WO2022/035376
PCT Pub. Date: Feb. 17, 2022

(65) Prior Publication Data
US 2024/0013598 A1  Jan. 11, 2024

(30) Foreign Application Priority Data
Aug. 11, 2020  (SG) ............... 10202007681U

(51) Int. Cl.
*G07C 9/00* (2020.01)
*G07C 9/27* (2020.01)

(52) U.S. Cl.
CPC ..... *G07C 9/00571* (2013.01); *G07C 9/00904* (2013.01); *G07C 9/27* (2020.01)

(58) Field of Classification Search
CPC ...... C07H 21/00; C07H 21/04; C12N 15/111; C12N 15/113; C12N 2310/11;
(Continued)

(56) References Cited

U.S. PATENT DOCUMENTS

| 10,517,125 B1* | 12/2019 | Hadadi | ................. H04W 76/10 |
| 2017/0103647 A1* | 4/2017 | Davis | ................. H04W 12/068 |
| 2020/0410801 A1* | 12/2020 | Rahilly | ................. G16H 40/20 |

FOREIGN PATENT DOCUMENTS

| CN | 106846573 A | 6/2017 |
| CN | 209486749 U | 10/2019 |
| CN | 110535767 A | 12/2019 |

OTHER PUBLICATIONS

ISR; Intellectual Property Office of Singapore; Sep. 30, 2021.
Sharon Shea, IoT Agenda.Com, LPWAN; Sep. 26, 2017.

* cited by examiner

*Primary Examiner* — Omer S Khan
(74) *Attorney, Agent, or Firm* — Patshegen IP; Moshe Pinchas

(57) ABSTRACT

The present invention discloses smart IoT end devices (500,502,503, etc.) system (100) supervised by a smart gateway device (400) at a secure site and secure methods of operating the system. An AI module (204), connected to a server (200) in the system (100), polls a quality of service of a low-power wide-area network (LPWAN) (300), the smart gateway, the smart IoT devices communication links (200, LR,SR), cellular (10,20) and any available network (including an IoT (302) at the secure site) and selects an optimal security level of operation according to any one of access scenarios A-E; access scenario A is endowed with the highest security level, whilst access scenario E is for off-line emergency operation. In all scenarios of operations, the gateway (400) and the smart IoT devices (500) are monitored at the server (200) ensuring 24-hours 7-days a week supervision.

11 Claims, 6 Drawing Sheets

(58) Field of Classification Search
CPC .......... C12N 2310/113; C12N 2310/14; C12N 2310/315; C12N 2310/321; C12N 2310/3231; C12N 2310/341; C12N 2310/3533; C12N 2320/30; E05B 2047/0095; E05B 39/04; G07C 9/00309; G07C 9/00571; G07C 9/00896; G07C 9/00904; G07C 9/27; H04W 4/30; Y02D 30/70

See application file for complete search history.

SMART IOT END DEVICES SUPERVISED BY A GATEWAY DEVICE AND SECURE METHODS OF OPERATION

RELATED PATENT APPLICATIONS

This patent application claims priority from Singapore patent application filed on 11 Aug. 2020. This is also a continuation-in-part (CIP) of the U.S. patent application Ser. No. 16/764,005 or PCT/SG2018/050579 entitled "Gateway Device For IoT Sensors Or Actuators" filed on 27 Nov. 2018.

FIELD OF INVENTION

The present invention relates to smart IoT end devices system supervised by a smart gateway device and secure methods of operation for a user access to a secure site. This secure operation methods serve critical infrastructure assets located at secure sites with 24-hours, 7-days-a-week supervision at low data cost and high security; even when quality of service of a low-power wide-area network (LPWAN) used by the system has deteriorated or the gateway device has failed, the smart IoT devices remain operable or to maintain security at the secure sites. Operation of these smart IoT devices is especially useful where the secure sites are distributed across a wide geographical region.

BACKGROUND

Assets, being valuable, are usually located in secure areas, invariably under locks or padlocks and keys. Smart locks and padlocks are also sought to secure sites of critical installations, such as, telecommunication stations, in which entry access is controlled and monitored 24-hours, 7-days-a-week. Smart locks offer compelling benefits over conventional, mechanical locks. In a secure system, these smart locks provide improved security, with enhanced efficiency and lower operating costs, especially when these secure sites are located over a wide geographical region. With smart lock implementation, travelling time to and forth to collect and to return physical keys from an operations centre is eliminated by providing virtual keys to authorized users; further, the operations centre or a server connected to the operations centre can be managed remotely, for eg., via a tablet or smartphone, from another office or from home; apart from travel time and operational efficiency, there are also real health and safety benefits by cutting down on travelling. Also, data collected on smart lock operations can be analyzed to improve operation, to improve security, for troubleshooting, and so on; these are some advantages for organizations managing thousands of distributed assets or sites.

To attain the highest security standards demanded for such critical infrastructure assets at a secure site, these smart locks need to be supervised or monitored continuously 24×7. In a conventional telco environment using 3G/4G/5G, such a demand requires substantial device power and is thus expensive to operate. Low-power wide-area networks (LP-WANs) are now sought to provide 24×7 supervision or monitoring at low data transmission cost and low power consumption. However, building LPWAN capability into large numbers of smart locks is operationally problematic and expensive. An efficient approach to solving this problem is to provide on-site LPWAN gateway devices that communicate in long-range (LR) directly with the operations centres and/or associated server, preferably in real-time, over a LPWAN network, as is disclosed by Applicant in patent application nos. PCT/SG2018/050579 and 10201708266U in Singapore; these gateway devices then supervise or communicate over short-range (SR), (for example, via Bluetooth) centrally with the other smart IoT devices; these smart IoT devices include smart locks and other accompanying smart sensors or actuators, intrusion alarms, motion sensors, security cameras, smoke detectors, and so on; some of these sensors may monitor temperatures of equipment, oil or gas levels of generators, and so on. Utilising a gateway architecture for smart IoT devices' operations means only a single LPWAN subscription is required at a secure site.

The most secure mode of operation of the above smart IoT devices is for the smart gateway device to be operational continuously 24×7 and for every transaction to be conducted in real-time and recorded in the server. However, despite LPWAN networks being designed for high reliability, there will be occasional network outages. There will also be times when the gateway devices fail or possibility of the gateway devices being stolen; yet during such network or gateway device failure, at least the smart locks must remain operational. It can thus be seen that there exists a need to provide secure methods for operating these smart locks or smart IoT devices at all times, be it during normal routine operation or during partial or complete system outage.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide secure methods or modes for operating smart IoT devices located at critical infrastructure secure sites, which are located over a wide geographical region. At each secure site, the smart IoT devices are supervised by a smart gateway device; the gateway device is centrally located so that it is in short-range (SR) communication with the smart IoT devices and in long-range (LR) communication with an operations centre or a server through a low-power wide-area network (LP-WAN). One of the smart IoT devices is a smart lock, which is operable to control access to the secure site; to ensure high security at the secure site, the system's methods of transmitting virtual keys and authentication credentials are provided that allow the system to operate in a highly secure manner during normal routine operation and during partial or complete system outage or gateway device failure.

In one embodiment, the present invention provides a smart IoT device operating and monitoring system comprising: a server; an artificial intelligence (AI) module connected to the server; a low-power, wide-area network (LP-WAN); a smart lock configured as one of various smart IoT device for controlling a user entry to a secure site; and a smart gateway device supervising the smart lock and the various smart IoT devices located at the secure site; wherein the server, the LPWAN, the smart gateway device, the smart lock/smart IoT devices are in sequential communication links, so that the smart lock and IoT devices operations are monitored continuously 24-hours, 7-days, with a lock operation access scenario selection being controllable by the AI module according to a determined quality of service at the communication links, any cellular communication link and at any other communication link (including an IoT network) that is available at the secure site.

In another embodiment, the present invention provides a method for operating the above smart IoT lock system, with the method comprising: generating an access instance after an access request to the secure site has been approved, where the access instance comprises a user identity, smart lock identity, a scheduled date and time of visit to the secure site; determining a quality of service by the AI module, with the AI module comprising a pre-selection module and a lock operation access scenario selection module, with the pre-selection module determining a historical quality of service of the LPWAN link and the lock operation access scenario selection module determining a current quality of service of all available communication links (including any cellular or IoT network, and any failure of the gateway device or the server); and selecting a lock operation (from so-called access scenarios A-E) according to the determined quality of service at all communication links at the gateway and at the user device.

Preferably, the user device operates a user application and has communication links to the smart lock, the gateway or the server through the LPWAN, a telco or IoT network. User access includes an approval in the form of an access instance. Also, preferably, the AI module includes a pre-selection module and an access scenario selection module. In one embodiment, the master module is connected to the server whilst a slave module is connected to the gateway device.

The preselection module determines a historical quality of service of the LPWAN links, whilst the access scenario selection module determines a current quality of service of all communication links available at the secure site.

Depending on findings of the preselection and access scenario selections modules, the access instance and lock virtual key are sent to the gateway device, the smart lock or the user device application according to any one of access scenarios A-E with differing levels of security.

Preferably, during lock operation, the scheduled visit date and time comprised in the access instance are verified against a RTC reference associated with the server, the gateway or the smart lock. A device key manager residing in the server is operable to register, create, remove, renew or update and monitor all the lock virtual keys and to manage sending of the lock virtual keys in coordination with the access scenario selection module; the device key manager can operate in a centralized mode or a distributed mode depending on whether the server is functioning in real-time.

BRIEF DESCRIPTION OF THE DRAWINGS

This invention will be described by way of non-limiting embodiments of the present invention, with reference to the accompanying drawings, in which.

DETAILED DESCRIPTION

Figure 1:
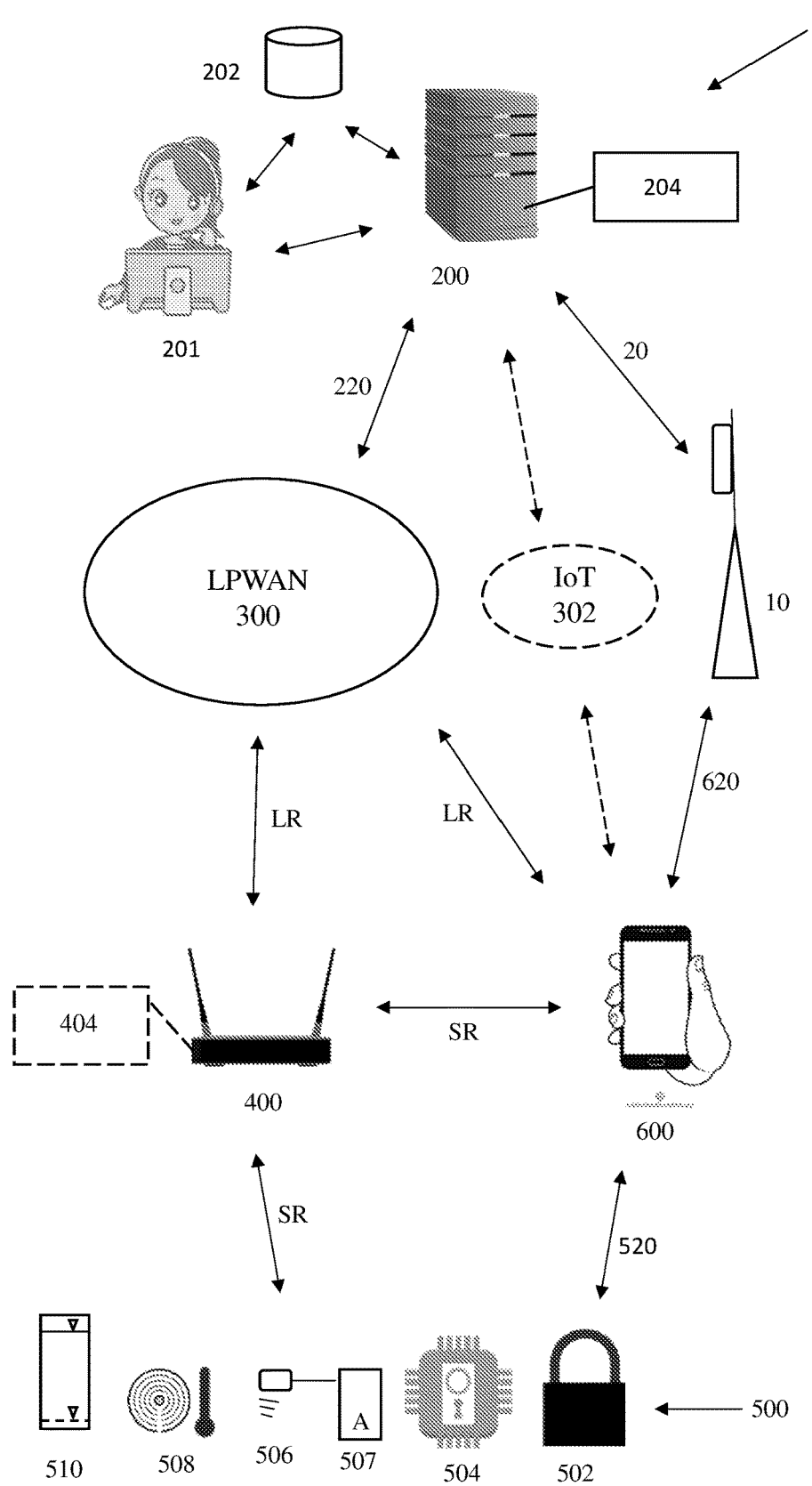
FIG. 1 illustrates a system architecture for implementing smart IoT devices' operations via a gateway device, a LPWAN and a server according to an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the present invention. For ease of reference, common reference numerals or series of numerals will be used throughout the drawings when referring to the same or similar features common to the drawings.

FIG. 1 shows an architecture of a secure system 100 for operating smart IoT devices 500 located at an infrastructure site or a secure site. As seen from FIG. 1, the secure system 100 includes a smart gateway device 400 in long-range (LR) communication with a server 200 through a low-power wide-area network (LPWAN) 300; the smart gateway device 400 in turn supervises some smart IoT devices 500,502, etc. via short-range (SR) communication. An authorized user is able to link up in SR communication with both the smart IoT devices 500,502, etc. and the gateway device 400. In addition, the server 200 is in wireless or cellular communication link 20 with an authorized user device 600 via a telco cellular system 10 or via a co-existing IoT network 302 (such as, SigFox, LoRA, etc.) that may be available at the secure site. As shown, an Operations Centre 201 is linked up in communication with the server 200, whilst the server is supported by a database 202. The Operations Centre 201 is also provided with access rights to records in the database 202, for eg. during protracted communication outage. Connected to the server 200 is an artificial intelligence (AI) module 204 to help control the secure methods or modes of operation of the secure system 100; in another embodiment, an AI module 404 is alternatively connected to the smart gateway device 400; it is also possible that the AI modules are connected to both the server 200 and the smart gateway 400, such that the AI module 204 connected to the server is operable as a "master" whilst the AI module 404 is operable on a "slave" relationship. The LPWAN 300 may be configured variously on a SigFox, Lora, NBIoT or similar platform; it is possible the LPWAN 300 and IoT network 302 may share network access or cooperate with one another to provide geographically wide coverage.

These smart IoT devices 500 include smart lock or padlocks 502 or door locks 504, sensors (such as, temperature and humidity sensors 508, oil or gas level gauges 510, proximity sensors, motion sensors 506, cameras, etc.) or actuators (such as, an intrusion alarm 507). The secure system 100 is now described with a smart lock 502 being used as an example of the smart IoT device 500 together with the AI module 204 connected to the server 200 for ease of illustration, with the following modes of secure operation and security levels:

Scheduled routine operation with the server and gateway device in real-time communication, where a virtual key is sent to the gateway device only during scheduled lock operation (Access Scenario A): This is the most secure mode of operation and security attributes, including virtual keys, lock identity and site identity, are managed and controlled by the Operations Centre 201, and are stored within the server 200,202 in real-time. In this secure and real-time mode, operations of all the IoT devices 500,502,504, etc. and the gateway device 400 are monitored at the Operations Centre 201 and transactions involved are recorded in the server 200,202. In other words, communication links in the secure system 100 are in real-time, the gateway device 400 is fully operational and status of the IoT devices 500,502,504, etc. are continuously monitored 24×7.

Figure 2:
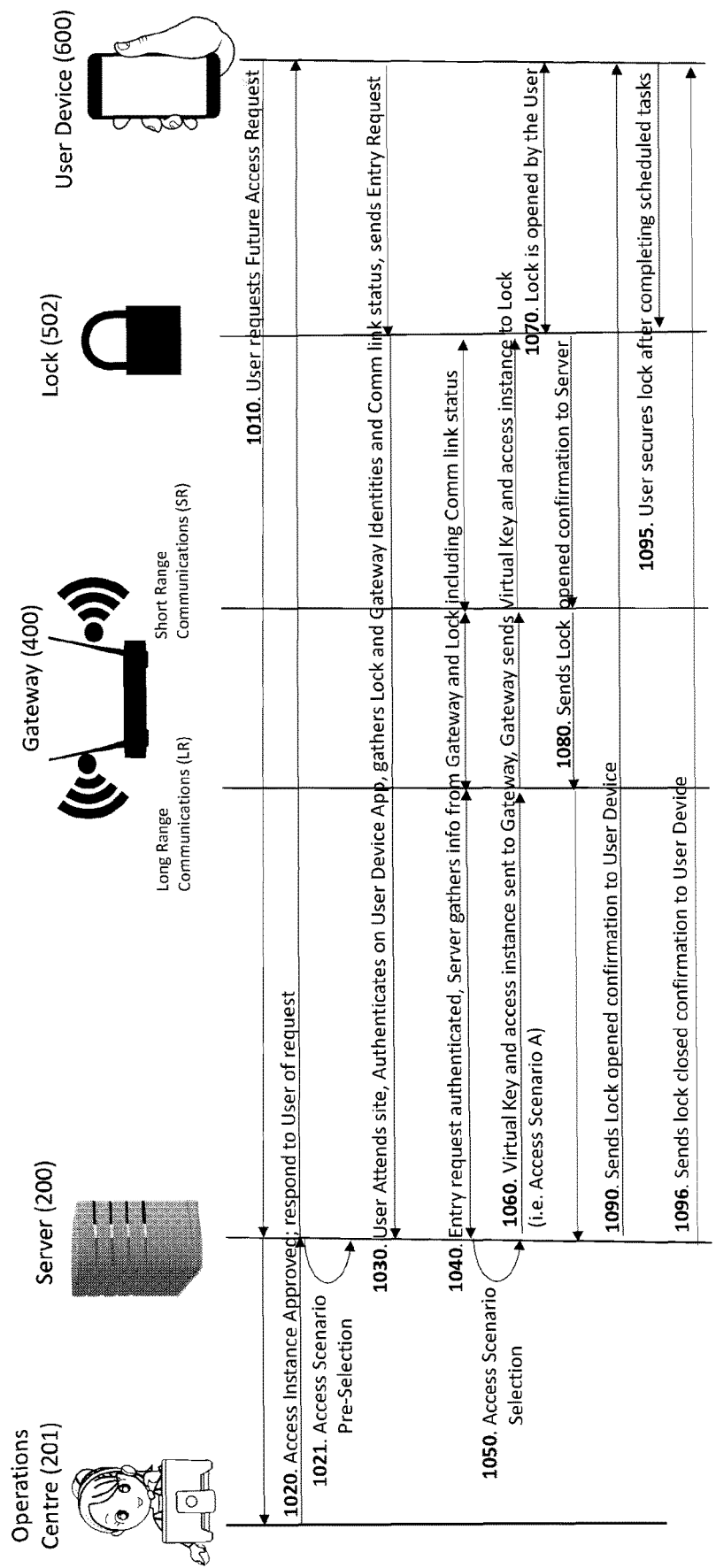
FIG. 2 illustrates the above smart IoT device operating under a normal routine or scheduled real-time operation with the server, with the IoT device being exemplified by a smart lock and a virtual key being sent to a smart lock during scheduled lock operation.

FIG. 2 illustrates a cycle of process steps of a user requesting access to a secure site, opening a lock 502 to enter the secure site, operating the lock 502 to secure the site after scheduled tasks have been completed, with all communication links being in real-time and status of the IoT devices are recorded in the server 200,202 as under access scenario A. Referring to FIG. 2, in step 1010, the user requests site access in advance of a scheduled site visit or an appointment using user device 600 application and the access request is sent to the server 200 and the Operations Centre 201; in one embodiment, the access request includes the site identity, and date and time of visit. The access request may be sent in real-time through the LPWAN 300, the IoT network 302, the telco cellular network 10 or the gateway 400, via the user device 600 application, by SMS, email, phone call to an automated application operating in the server 200 or a phone call to the Operations Centre 201. After receipt of the access request, the Operations Centre 201 or the automated application in the server reviews the access request; if approval to access the secure site is granted, the approval is sent, in step 1020, from the Operations Centre 201 to the server 200 in the form of an access instance; the access instance contains the user identity, lock identity, gateway identity, and scheduled date and time of visit. This approved access instance is stored in the server 200,202 for verification of future entry requests when the registered user attends to the secure site. In addition, in step 1020, the mobile user device 600 is informed of the approved access instance has been created or granted.

Figure 6:
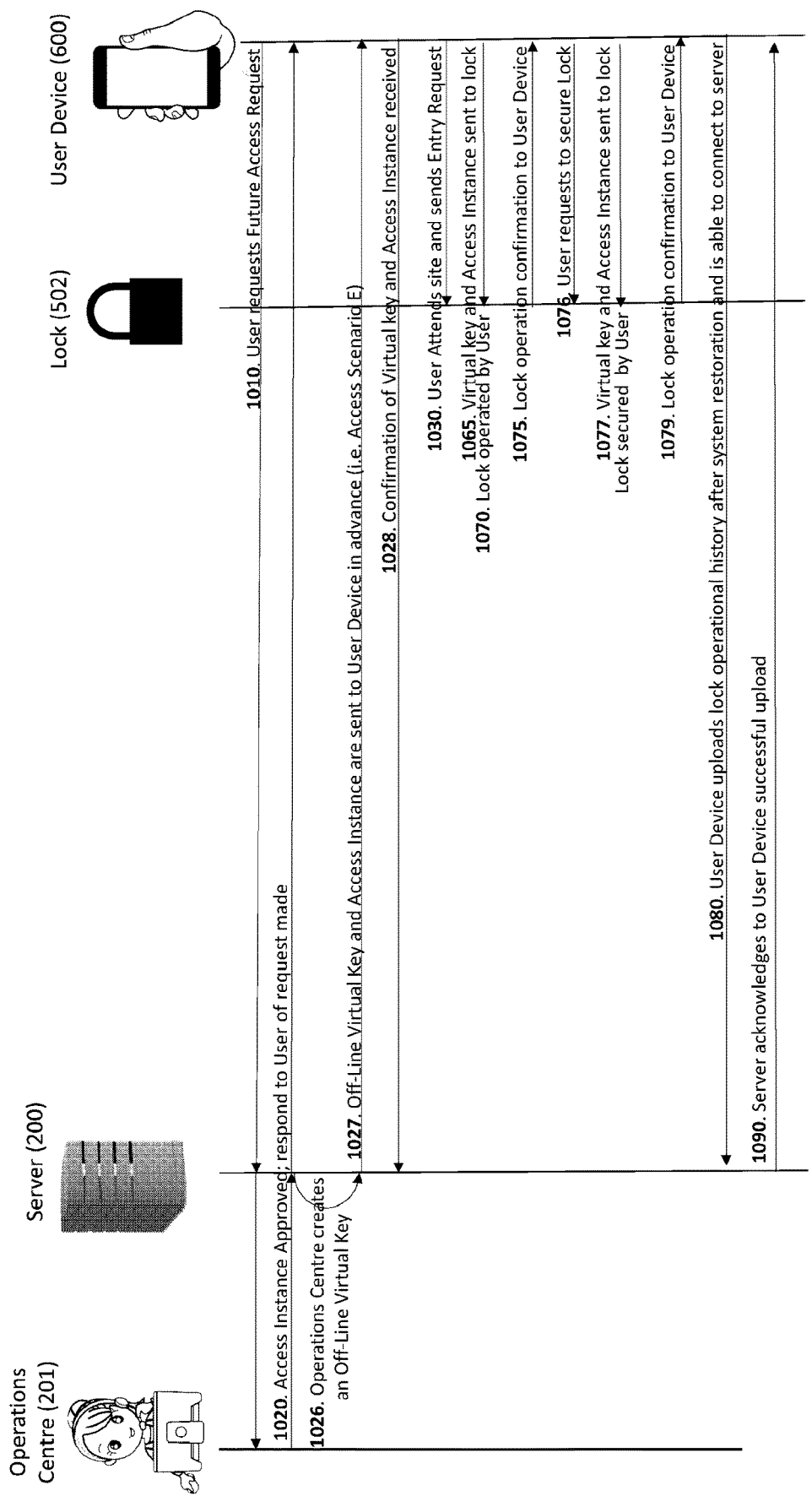
FIG. 6 illustrates the above smart lock operation during a system outage or after the gateway device has failed and the server is updated after lock operation.

In step 1021, an Access Scenario Pre-selection is made by the AI module 204 considering historical performance of the quality of service of the gateway LR and SR communication links as well as user device 600 connectivity at the location (via the telco cellular network 10 and/or IoT network 302) and identity of the user who has sent the access request (identity of the user, for eg. in FIG. 6, off-line virtual keys may be issued only to trusted employees). The artificial intelligence (AI) module 204 connected to the server 200 then makes autonomous access pre-selection decision based on Table 1 below. This access pre-selection in step 1021 thus affects the method of secure operation of the system 100:

TABLE 1

Access scenarios A-E pre-selection based on historical performance of communication links with the server 200:

| Access Scenario | Mode of Operation | Preferred or Non-preferred operation method | Gateway Long Range + Short Range communications operational performance satisfactory? | Gateway Long Range performance not satisfactory + Short Range communications operational performance satisfactory? | Gateway Long Range + Short Range communications operational performance not satisfactory or not installed? | User Device Application connectivity via Telco or IoT network non-operational at Lock location? |
|---|---|---|---|---|---|---|
| A | On-Line | Preferred | True | False | False | False |
| B | On-Line | Preferred | False | True | False | False |
| C[1] | On-Line | Preferred | False | True | False | False |
| D | On-Line | Non-Preferred | False | False | True | False |
| E | Off-Line | Non-Preferred | False | False | True | True |

[1]Note in Access Scenario pre-selection inputs for both scenarios B and C are identical, it is only in the later step 1050 where actual scenario selection occurs does implementation differs.

In this specific case, as quality of service is highly reliable, access scenario A has been selected. The historical quality of service of the gateway LR and SR communication links, user device 600 connectivity at the lock location and identity of the user determine the access scenario pre-selection.

As scheduled, the user attends to the secure site, in step 1030, and logs in to the system 100 with the user device 600 application; in the process, the user identity, user device identity, lock identity and system password are verified. Initially, the user device 600 application verifies the user identity, user device identity, user device password and system password with user credentials registered in the user device 600 application. At this stage, the authorized user wakes up communication link 520 with the smart lock 502, and the user device 600 application verifies current status and quality of the LPWAN network 300, both SR and LR communications links as well as any other connectivity the user device 600 may support (such as the IoT network 302, which may include SigFox, LoRA, etc.). Once the verification processes are completed, the user device 600 application sends an entry request containing the user identity, user device identity, user system password, lock identity, gateway identity, the communication links quality and status back to the server 200, in step 1030; information is sent either via the LPWAN 300 or cellular communication network 10 or the gateway 400, or the IoT network 302 (eg. SigFox, LoRA, etc.) depending on operation of these communication links and networks as well as the preferred operation mode the system 100 is configured as. In response, in step 1040, the server 200 authenticates the user credentials from the entry request with the approved access instance registered in the server 200; once the user and site access credentials (including the smart lock and gateway identities) are verified to be true, the server 200 further verifies the scheduled date and time of visit with the server's real-time clock reference (server RTC). If all credential verifications at the server 200 are true, the server 200 gathers identity of the gateway device 400 associated with the smart lock 502 and the AI module 204 interrogates current quality of service and status of the gateway 400 LR and SR communication links as well as user device 600 connectivity in step 1050.

The current quality of communication service, status of the gateway LR and SR communication links, and user device 600 connectivity at the site location determine the access scenario selection in Table 2, as follow:

server 200 sending a confirmation of "locked" status at the secure site to the user device 600 application, in step 1096. These transactions performed by the above steps are in real-time and the records are kept for a predetermined period of time, for example, for data analytics or trouble-shooting. When a user needs access to the secure site to perform some tasks and makes another access request, the above secure system 100 cycles through the process steps 1010-1096

TABLE 2

Access Method selection using current QoS and status of gateway links and user device connectivity at site location and site configuration:

| Access Method Selected | Gateway Installed for associated smart Lock (Gateway registered in Server)? | Long-Range Communication Gateway Intact? | Short-Range Communication Gateway Intact? | Mobile Devices Communication to Server via LPWAN network or Gateway possible at location? | Mobile Devices Communication to Server via Telco or IoT Network possible at location? | Virtual Keys pre-loaded in Gateway? |
|---|---|---|---|---|---|---|
| A | Yes | Yes | Yes | | Yes | |
| A | Yes | Yes | Yes | Yes | No | |
| B | Yes | Yes | Yes | | Yes | Yes |
| B | Yes | Yes | Yes | Yes | No | Yes |
| C | Yes | No | Yes | | Yes | Yes |
| C | Yes | No | Yes | Yes | No | Yes |
| D | Yes | No | No | | Yes | |
| D | Yes | No | No | Yes | No | |
| D | Yes | Yes | No | | Yes | |
| D | Yes | Yes | No | Yes | No | |
| D | No | | | | Yes | |
| D | No | | | Yes | No | |
| E | Yes | No | No | | No | |
| E | No | | | No | No | |

The artificial intelligence module 204 connected to the server 200 then makes autonomous access decision based on the current quality of service of the LR and SR communication links, user device connectivity as well as site configuration according to Table 2.

In step 1050, the AI module 204 queries the LR and SR communication links at the gateway device 400, user device 600 communication links, whether the secure site is gateway equipped, state of any pre-loaded virtual keys in any associated gateway as well as presence of the smart lock 502 with values in truth Table 2 and decides on access scenario A to operate the system 100.

In response to granting of access scenario A, a virtual key for opening the smart lock 502 is sent, in step 1060, together with the access instance, to both the gateway device 400 and the smart lock 502 via the LR, the SR communication links and the LPWAN 300; sending the virtual key only during scheduled site visit ensures the highest security level of this system 100. In step 1070, the user opens the lock 502 and gains entry to the secure site; this triggers a change of state of a sensor in the smart lock 502 from "locked" to "unlock" and the status change of the lock is sent, in step 1080, to both the gateway device 400 and the server 200; the server then updates the records of the user identity, lock identity, date and time of entry to the secure site. Following step 1080, step 1090 hand-shakes by sending a lock operation confirmation message to the user device 600 application. Once the authorized user has completed the scheduled tasks at the secure site, and before leaving the secure site, operates the lock 502 to lock-up the site, in step 1095, the sensor in the lock sends a "locked status" to both the gateway device 400 and the server 200, and the records of site entry in the server 200 are then updated and the access request made may be indicated as "done"; the cycle of processing ends with the again to ensure that only an authorized user can enter the secure site and security demanded at the site is continuously monitored 24×7.

Figure 3:
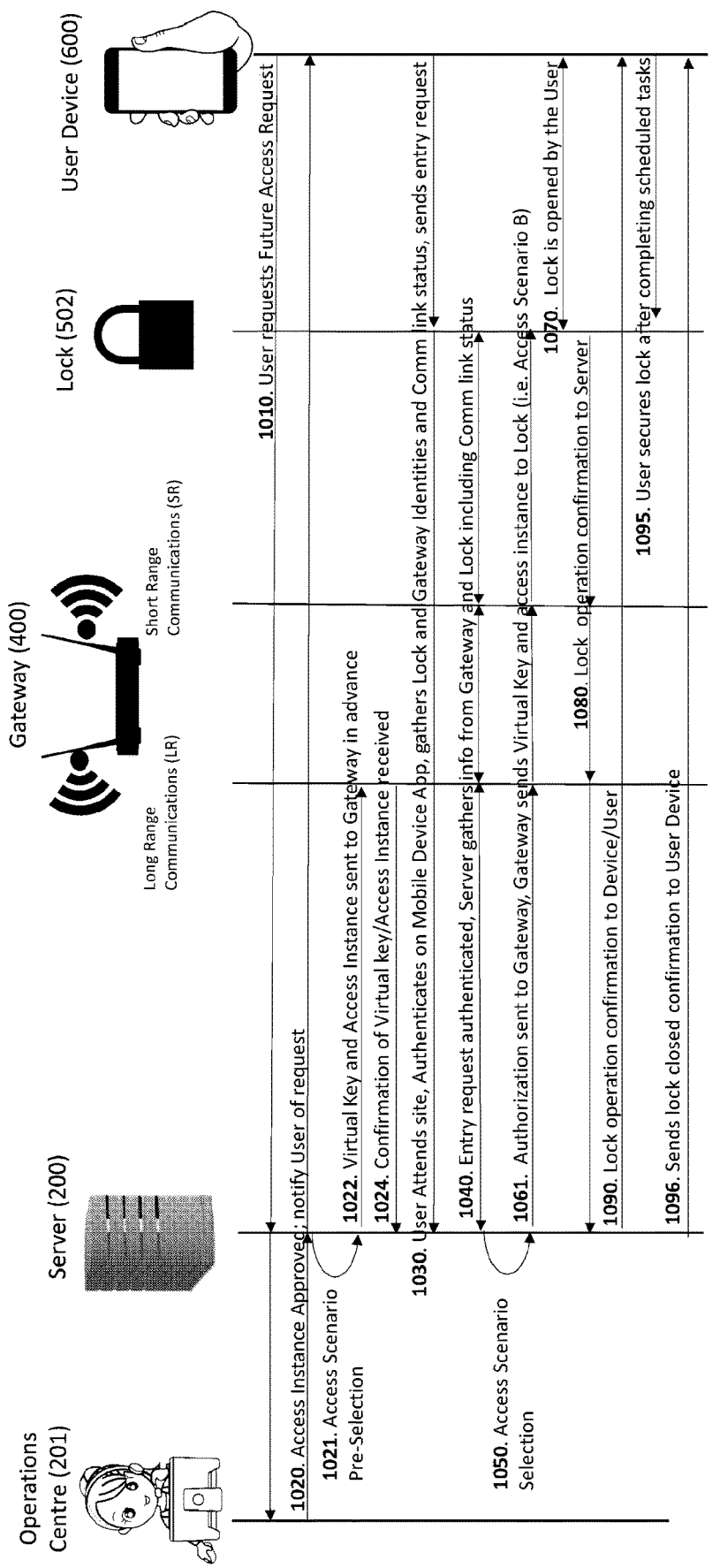
FIG. 3 illustrates the above smart lock operating under a scheduled real-time operation with the server with the virtual key being sent to the gateway device in advance of scheduled lock operation.

Scheduled routine operation with the server and gateway device in real-time communication and the virtual key is being sent in advance to the gateway device (Access Scenario B): In this access scenario B, the current quality of service of the LR communication link has dropped, say from 99% to 90%, and the AI module 204 connected to the server 200 is programmed to pre-select access scenario B, in step 1021, basing on truth Table 1. To overcome this deficiency, in step 1022, the virtual key and the access instance (containing the user identity, lock identity, gateway device identity, and scheduled date and time of visit) are now sent in advance of the scheduled visit directly to the gateway device 400, as shown in FIG. 3; as will be understood, sending the virtual key and access instance to the gateway device 400 in advance of the scheduled visit still ensures a high security but at a level lower than for Access Scenario A. As in Access Scenario A, all communication links remain in real-time and the status of the smart lock 502 are recorded in the server 200,202. Following step 1022, in step 1024, confirmation of receipt of the virtual key and access instance are sent from the gateway device 400 to the server 200. Process steps 1010, 1020 and 1021 for requesting access, access approval and access pre-selection are identical to those described under access scenario A and will not be described again.

As shown in FIG. 3, the authorized user attends to the site visit, and steps 1030, 1040 and 1050 are executed identically to those described under access scenario A and therefore will not be described again.

Within access scenario selection step 1050, as in access scenario A, the AI module 204 polls the current quality of service of the various communication links and finds that the LR communication link at the gateway 400 which historically was deficient is currently still intact with sufficient quality and thus selects access scenario B; following which, in step 1061, after credential verifications, the server 200 sends an authorization to the gateway device 400 to issue the virtual key and the access instance to the smart lock 502. The user at the secure site turns on the user device 600 application and sends a "lock open" command to the smart lock 502, in step 1070; the smart lock sensor responds, in step 1080, and step 1090 handshakes lock "open" operation with the user device application. After the authorized user has completed the scheduled tasks and locked up the secure site, in step 1095, the lock sensor sends a "locked" status to both the gateway device 400 and the server 200, and records of site entry in the server 200 are then updated and the access request is updated to "done"; the cycle of processing ends with the server 200 sending a confirmation of "locked" status at the secure site to the user device 600 application, in step 1096.

Figure 4:
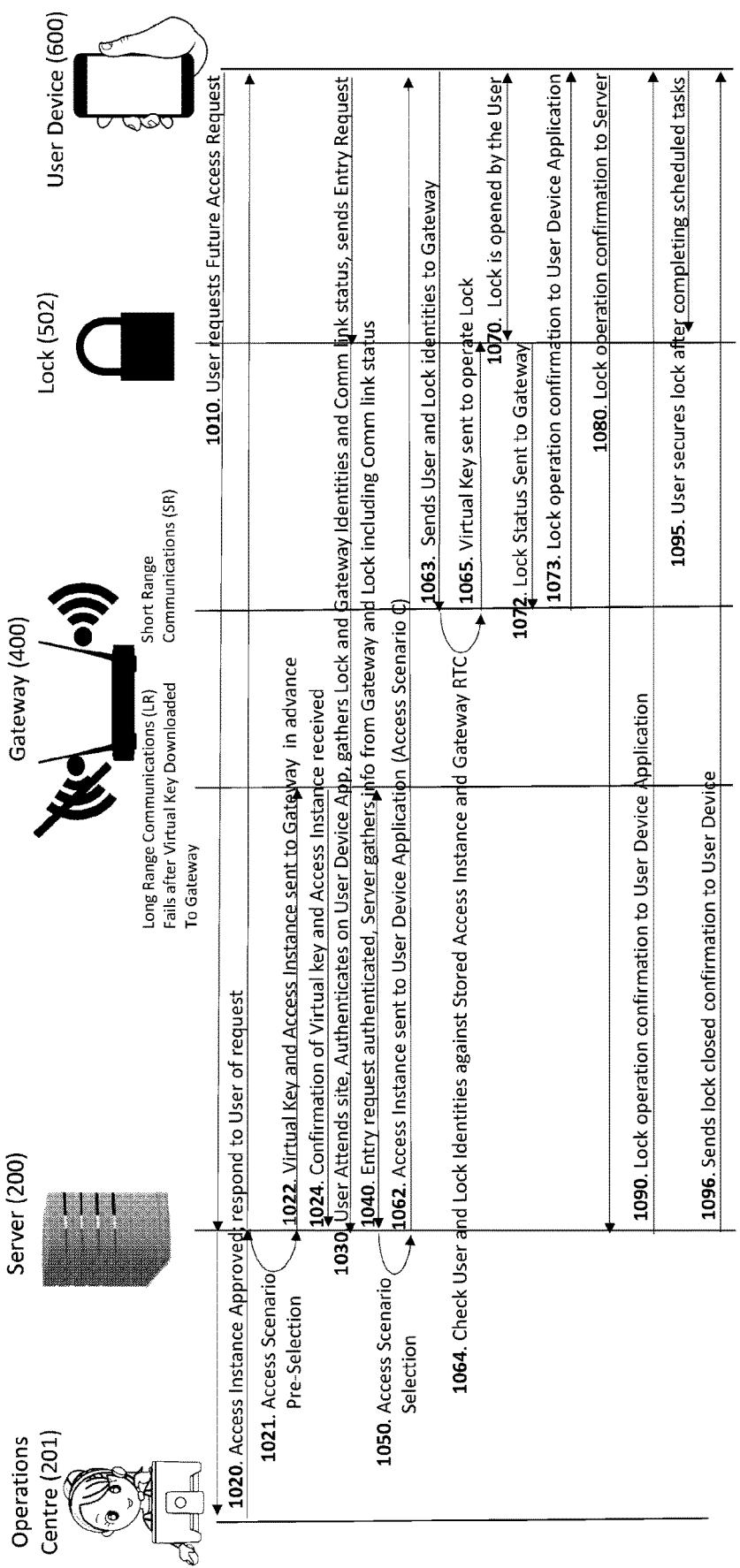
FIG. 4 illustrates the above smart lock operation under a scheduled real-time operation with the server with the virtual key being sent to the gateway device in advance of scheduled lock operation, after which the long-range (LR) communication at the gateway device failed.

Scheduled routine operation with the server and gateway device in real-time communication and after virtual key has been sent in advance to the gateway device, the LR link failed (Access Scenario C): This access scenario C is a progression from the previous access scenario B, in that the LR communication link is historically deficient and after the virtual key and access instance to open the smart lock 502 had been sent to the gateway device 400 in advance of the site visit and the entry request, the LR communication link at the gateway failed. FIG. 4 illustrates the process steps involved in access scenario C.

Steps 1010, 1020, 1021, 1022, 1024, 1030 and 1040 are as described above and will not be described again. In step 1050, the AI module 204 interrogates current quality of service of the various communication links and finds that LR communication link has deteriorated; subsequently, during user and entry request authentications, the LR communication link is either non-functional or functioning but at a lower quality and reliability than in access scenario B; thus, in step 1050, with the LR communication link having failed or deteriorated (as shown in truth Table 2), the system 100 progresses to execute step 1062 by the server 200 sending the access instance to the user device 600 application according to access scenario C. The user device 600 application then sends, in step 1063, the user identity and the lock identity to the gateway device 400 via the SR communication link; in the gateway device 400, the user and the lock identities are verified against the approved access instance stored in the gateway 400 and the entry date and time are checked against the gateway RTC, in step 1064; once these verifications are true, the gateway device 400 sends the virtual key, in step 1065, to the registered smart lock 502. In step 1070, the authorized user attends to the site and opens the smart lock 502 to enter the secure site. The sensor in the smart lock 502 responds, in step 1072, by sending a changed status to the gateway device 400 via the SR communication link; the gateway device 400, then, confirms the lock "open" operation in step 1073 and, in step 1080, the lock "open" status is sent to the server 200 from the user device 600 application (for eg. via the LPWAN 300, the telco cellular 10 or the IoT network 302, given that the LR communication link at the gateway 400 has failed or has deteriorated performance); the server 200 then updates records of the user identity, lock identity, and the date and time of entry to the secure site; in step 1090, a lock "open" confirmation message is sent from the server 200 to the user device 600 application. After user has completed the scheduled tasks and locked up the secure site, in step 1095, the lock sensor sends a "locked" status to both the gateway device 400 and the server 200, and the records of site entry in the server 200 are then updated and the access request is updated to "done"; the cycle of processing ends with the server 200 sending a confirmation of "locked" status, in step 1096, at the secure site to the user device 600 application.

In access scenario C, the virtual key and access instance being sent to the gateway device 400 in advance of the scheduled visit still ensures a high security but at a level lower than for access scenario A, even after the LR communication link at the gateway 400 has failed or deteriorated. As in access scenarios A and B, all communication transactions remain in real-time and the status of the smart lock 502 is monitored continuously.

Scheduled routine operation between the server and user device application in real-time and after the virtual key to the lock has been sent to the gateway device, both the LR and SR link at the gateway device failed or deteriorated (Access Scenario D): As in the above processes, steps 1010, 1020, 1021, 1022 and 1024 involve user requesting access to a secure site and after verification and approval, an access instance and lock virtual key are sent to the gateway 400 in advanced of the scheduled visit. In step 1030, the authorized user attends to the secure site, turns on the user device 600 application and sends an entry request to the server 200 via the LPWAN 300, the telco cellular 10 or the IoT 302 network; in response, in step 1040, the server 200 authenticates the user credentials from the entry request with the credentials registered in the server 200; once the user identity and the access instance are verified to be true, the server 200 further verifies the entry date and time with the server's real time clock (server RTC) reference. If all credential verifications at the server 200 are true, the server gathers identity of the gateway device 400 associated with the smart lock 502 and interrogates states of operation of the gateway LR and SR, the user device communication and presence of the smart lock 502, in access scenario selection step 1050. So, in step 1050, the AI module 204 detects that the gateway device 400 has failed and/or missing, and thus selects access scenario D based on the truth Table 2.

Figure 5:
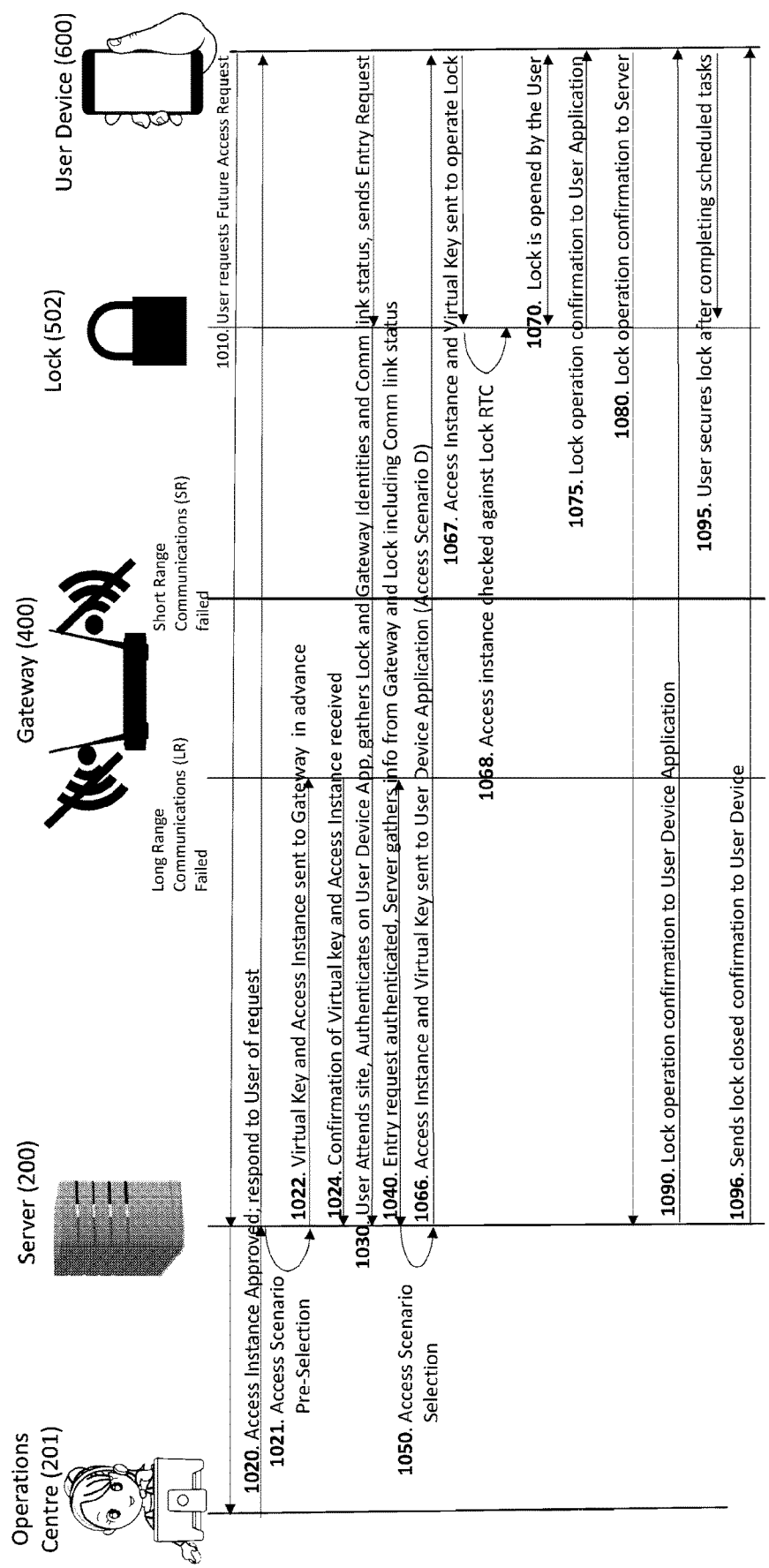
FIG. 5 illustrates the above smart lock operation under a scheduled real-time operation with the server with the virtual key being sent to the gateway device in advance of scheduled lock operation, after which both the long-range (LR) and short-range (SR) communications at the gateway device failed.

As shown in FIG. 5, in step 1066, the virtual key and the access instance are sent from the server 200 to the user device 600 application as well as instructions to use access scenario D; in response, in step 1067, the virtual key and the access instance are sent to the registered smart lock 502 and, in step 1068, the access instance, and the access date and time are verified against the smart lock RTC. Once the access instance is determined to be true, the lock is unlocked, in step 1070. An "open" status of the smart lock 502 is sent back to the user device 600 application, in step 1075. The lock "open" status is also sent to the server 200, in step 1080, via the LPWAN 300, the telco cellular 10 or IoT 302 network; in response, the server 200 then updates records of the user identity, lock identity, date and time of entry at the secure site and, in step 1090, a lock "open" confirmation message is sent from the server 200 to the user device 600 application. After user has completed the scheduled tasks and locked up the secure site, in step 1095, the lock sensor sends a "locked" status to the server 200; the records of site entry are then updated in the server 200,202 and the access request is updated to "done"; the cycle of processing ends with the server 200 sending a confirmation of "locked" status, in step 1096, at the secure site to the user device 600 application. In access scenario D, even when the gateway device 400 has failed or missing after the access request has been approved, all the process steps are still monitored in real-time and security at the secure site is still maintained.

Operation of the system 100 not in real-time (Access Scenario E): FIG. 6 shows the system 100 operations under access scenario E. In access scenario E, after a user has requested access to a secure site and approval has been granted, as in steps 1010 and 1020, the server 200, the LPWAN 300 and the gateway device 400 failed. A predetermined period after the access approval has been granted and the AI module 204 has failed to respond or has sent out an alert, the Operations Centre 201 generates an off-line virtual key for the registered smart lock 502, in step 1026, by activating an off-line subroutine application, and, in step 1027, the virtual key and the access instance are sent to the user device 600 application in advance of the site visit, via the telco cellular 10 or the IoT network 302. Upon receipt of the virtual key and the access instance by the user device 600 application, a confirmation message is sent, in step 1028, to the Operations Centre 201. After the authorized user has reached the secure site, and turns on the user device 600 application and sends, in step 1030, an entry request and a lock "open" command to the registered smart lock 502; in a following step, step 1065, the virtual key and the access instance are sent to the registered lock 502. As shown in FIG. 6, after the user identity, the lock identity and the access instance verification against the lock RTC are established to be true or valid, and the user sends a "lock open" command to open the smart lock 502, in step 1070, and gain entry to the secure site. The sensor in the smart lock 502 then responds, in step 1075, with an "unlock" status to the user device 600 application. After the user has completed the scheduled tasks and locked up the secure site, in steps 1076 and 1077, the lock sensor sends a "locked" status update, in step 1079, to the user device 600 application. After the server 200 operation has been restored, the user device 600 application connects up with the server 200, in step 1080, and, in step 1090, the server 200 acknowledges to the user device 600 application of successful upload; the server 200 follows up by updating records of site visit and changing the access request status as "done"; the above system 100 of cycle of processing ends, and the server 200 waits for the next cycle of a user making another access request.

In a variation of the above, it is possible that in access scenario E, the server 200 remains operational after performing steps 1010 and 1020; in this variation, the server 200 is programmed to generate an off-line virtual key for the registered smart lock 502 and to send the virtual key and the access instance to the user device 600 application in advance of the site visit, via the telco cellular 10 or the IoT network 302. The following steps from 1028 to 1090 are then executed to complete the above system 100 operation cycle under access scenario E.

In the above description, the access scenarios A-E are operational in terms of differing security levels. Access scenario A is the most secure lock operation where the lock virtual keys and the access instances are stored within the server 200 until the registered user has reached the secure site and sent a "lock open" command from the user device 600 application; effectively, all control and decision making are done from the Operations Centre 201 and the server 200 in real-time at all times, the gateway device 400, the IoT devices 500,502, etc. are monitored and their operation statuses are stored in the server 200; the term "in real time" means that the server 200 and the Operations Centre 201 know the status of the IoT devices 500,502, etc. in real-time. In addition, the lock virtual key is sent to the gateway 400 only during the scheduled date and time defined in the access instance, thus making the system very secure.

Access scenario B would be selected by the AI module 204 if the LR communication with the gateway device 400 has a history of deteriorated performance. This is to ensure that if during the scheduled access should the LR communications again failed or deteriorated, then since the lock virtual key and the access instance have been received by the gateway device 400, the smart lock 502 can still be operated as per access scenario B. In this specific case when the user attends to the secure site and the LR communications is found to be reliable, the AI module 204 would choose to use access scenario B. Effectively, lock operation is still controlled from the Operations Centre 201 or server 200 in real-time before the authorized user visits the secure site defined in the access instance.

Access scenario C is a progression from access scenario B where the LR communication at the gateway 400 failed or deteriorated after receipt of the lock virtual key and the access instance in the gateway 400. When the truth Table 2 is found to be true, the AI module 204 selects access scenario C, the gateway 400 is then approved to send the virtual key it contains to the registered smart lock 502. All the lock operations remain in real-time (albeit, via cellular 10, the LPWAN 300 communication link or the IoT network 302 with the server 200).

Access scenario D is a progression from access scenario C where the gateway 400 failed or deteriorated (eg. no LR and SR communication links) after gateway 400 receipt of the lock virtual key and the access instance; access scenario D can also happen where the gateway 400 is missing or stolen after gateway 400 receipt of the lock virtual key and the access instance. When the truth Table 2 is found to be true, the AI module 204 selects access scenario D and the lock virtual key and the access instance are sent directly to the user device 600 application, and all the lock operations remain in real-time (albeit, via telco cellular 10, the LPWAN 300 communication or the IoT network 302 with the server 200).

Access scenario E happens after an access request has been sent to both the server 200 and the Operations Centre 201 via the telco cellular 10, the LPWAN 300, or IoT network 302, and the system 100 responds with an approval, after which all the LPWAN 300, the telco cellular 10 and the network 302 links failed. The AI module 204 detects failure of all the LPWAN 300, the telco cellular 10 and the IoT network 302 links, and then selects access scenario E for emergency lock operation by generating an off-line virtual key and access instance; these off-line virtual key and access instance are sent directly to the user device 600 application after this emergency situation has occurred. After the user attends to the associated secure site and makes an entry request, the smart lock 502 responds appropriately. After the site visit, all the lock operations are loaded to the server 200 from the user device 600 application once any communication link to the system 100 is restored and the user device 600 application is re-connected to the server 200.

Under access scenario E, the lock's off-line virtual key and access instance are sent to the user device 600 application, but the server 200 or the Operations Centre 201 is unable to monitor status of the IoT devices 500, in particular the smart lock 502, until the user device 600 is logged-in to the system 100 again; this creates a security concern in that the user device 600 can be stolen or the user becomes rogue and security at the relevant secure site may thus be compromised; to address this security issue, in one embodiment, access scenario E may be reserved only for users who are trusted employees. To ensure that security at the secure site is not compromised in any manner, the above system 100 has a purge routine to purge all the virtual off-line keys and access instances that had expired and are stored in the gateway device 400 and smart IoT devices 500,502, etc. In another embodiment, it is possible that the virtual off-line keys are re-authorized in the trusted employees' user device 600 for use only during an emergency situation when there is a protracted system (the LPWAN 300, the telco cellular 10 or the IoT network 302) outage; such re-authorization process can be done by a dynamic key management process, either via a centralized mode or a distributed mode by an IoT device key manager that is operable in the server 200. In the centralized mode, the off-line virtual keys are changed or renewed only when the user visits the relevant secure site and makes an entry request; with this centralized mode, the smart locks 502 are woken-up from a sleep mode for access entry so as to conserve battery power. In the distributed mode, the off-line virtual keys are changed or renewed in a progressive manner after the system 100 has been restored from an outage. These changes or renewal of the off-line virtual keys are performed transparently from the users.

Records of the smart IoT operations are stored in the server 200 for a predetermined period of time to allow the system to perform operational data analytics or to investigate any past incident. These records containing the access instances are controlled by the server real-time clock reference (server RTC).

In addition, each of the smart gateway device and the IoT devices 500,502, etc. has its own real-time clock reference (namely, gateway RTC, smart lock RTC, intrusion alarm RTC, etc.). These device RTCs are programmed to purge the virtual keys and the access instances once the scheduled time and date had expired; if the scheduled date and time have not expired, the virtual keys can be renewed or recycled by the device key manager.

While specific embodiments have been described and illustrated, it is understood that many changes, modifications, variations and combinations thereof could be made to the present invention without departing from the scope of the present invention. For example, in the description, we describe a user making an access request from one's device application. Alternatively, it is possible that the system 100 is automated, site visits are scheduled by the Operations Centre 201 and the access instances are notified to the authorized users at their user devices. Alternatively, it is also possible that an unregistered user makes a voice call to the Operations Centre 201 and once the user identity is verified (for example, via video), an access instance can be sent to the user device 600 application. For added security, each of the secure site is also supervised by a motion sensor 506 and an intrusion alarm 507. Whilst a smart lock has been used in the above description, the system 100 is also used to monitor the various smart IoT devices 500 deployed at the secure site; for example, the door lock 504 is used to send status and date/time of door opening or closing to the server 200; the temperature and humidity sensor 508 is used to monitor the environmental conditions, and the fuel level gauge 510 is used to monitor the fuel level at an associated generator set.

The invention claimed is:

1. A smart IoT device operation method directed to a server, an artificial intelligence (AI) module connectable to the server, a low-power wide-area network (LPWAN), a smart gateway device located in a secure site, and a smart IoT device including a smart lock for controlling a user entry to the secure site, such that the server, the LPWAN, the smart gateway device and the smart lock are in sequential communication links, so that the smart IoT device operation method comprises:
   a user sending an access request to the server;
   the server generating an access instance after the access request to the secure site has been approved, wherein the access instance comprises a user identity, gateway identity, smart lock identity, a scheduled date and time of visit to the secure site;
   determining a quality of service by the AI module, with the AI module comprising a pre-selection module and a lock operation access scenario selection module, and the pre-selection module determining a historical quality of service of the LPWAN link and all available communication links (including any cellular or IoT network; and
   selecting a lock operation according to the historical determined quality of service at all the communication links at the gateway and at a user device, from the following scenarios:
   scenario A, wherein the server and the smart gateway device are functioning reliably, the access instance and a lock virtual key are sent only after the user has reached the secure site and sent an entry request to the server; or
   scenario B, wherein the server and the smart gateway device are functioning but the smart gateway device has a history of deteriorated reliability, the access instance and a lock virtual key are sent to the smart gateway device; or
   scenario C, wherein the server and the smart gateway device are functioning, the access instance and a lock virtual key are sent to the smart gateway device, and a long range (LR) communication link between the server and the smart gateway device is later found to be unreliable by the lock operation access scenario selection module; or
   scenario D, wherein the server and the smart gateway device are functioning, the access instance and a lock virtual key are sent to the smart gateway device, after which the smart gateway device is found to be defective or absent by the lock operation access scenario selection module; or
   scenario E, wherein after the smart gateway device and all the available communication links thereto are found to be out of working order due to an outage or non existent; and
   operating the smart IoT lock device at a secure level consistent with the selected access scenario.

2. The method according to claim 1, wherein, in access scenario A:
   polling a current quality of service of the communication links at the server, the smart gateway device and the smart lock by the lock operation access scenario selection module, and if all the communication links are found to be reliable, sending the lock virtual key from the smart gateway device to the smart lock after the user has sent the entry request to the smart gateway device, in order to maintain a highest level of security access; and
   upon, access completion, the smart gateway device sending lock operation confirmation to the server.

3. The method according to claim 1, wherein, in access scenario B:
   polling a current quality of service of the communication links at the server, the smart gateway device and the smart lock by the lock operation access scenario selection module, and if all the communication links are found to be reliable, sending the access instance and the lock virtual key to the smart gateway device after the user has reached the secure site and the user has sent the entry request, and sending the lock virtual key from the smart gateway device to the de or lock-of the smart lock; and upon access completion, the smart gateway device sending lock operation confirmation to the server.

4. The method according to claim 1, wherein in access scenario C:

polling a current quality of service at the LR communication link between the smart gateway device and the server by the lock operation access scenario selection module, and if found to be unreliable by the lock operation access scenario selection module, sending the access instance directly to the user device application from the server, and, after the user has reached the secure site and the user has sent both the user and lock identities to the smart gateway device, sending the lock virtual key from the smart gateway device to the smart lock; and upon access completion, sending lock operation confirmation to the smart gateway device the user device application and the server.

5. The method according to claim 1, wherein in access scenario D, polling a current quality of service of communication links at the smart gateway device and if found by the lock operation access scenario selection module to be defective or the smart gateway device is missing, sending the access instance and the lock virtual key directly to the user device application from the server after the user has reached the secure site and the user device application has sent the access instance to the smart lock, sending the lock virtual key to the smart lock; and upon access completion, sending lock operation confirmation to the user device application and the server.

6. The method according to claim 1, wherein in access scenario E, creating an off-line lock virtual key at an operations centre connected to the server or at the server and sending the off-line lock virtual key directly to the user device application, and after the user has reached the secure site and the user device application has sent the entry request and the access instance to the smart lock, sending the off line lock virtual key to the smart lock; and upon access completion, sending lock operation confirmation to both the user device application and the server after the use device application obtains connectivity to the server; and changing the off-line lock virtual key to maintain consistent secure level of operating the smart IoT lock device.

7. The method according to claim 6, further comprises purging the off-line lock virtual key stored in the user device application after the system outage is restored, either via a centralized mode or a distributed mode.

8. The method according to claim 1, further comprises:

verifying the scheduled visit date and time comprised in the access instance against a real-time clock reference (RTC) associated with the server, the smart gateway device, the door lock or the smart lock after the user has sent a "lock open" command from the user device application to the smart lock and before lock "open" operation is granted; and purging the access instance from the server, the smart gateway device or the smart lock after the respective scheduled visit date and time have expired.

9. The method according to claim 1, keeping records of the IoT device operations in the server for a predetermined period of time for data analytics or for investigative tracing.

10. The method according to claim 1, wherein in access scenario E, creating an off-line lock virtual key by the AI module and sending the off-line lock virtual key directly to the user device application, and after the user has reached the secure site and the user device application has sent the entry request and the access instance to the smart lock, sending the off-line lock virtual key to the smart lock; and upon access completion, sending lock operation confirmation to both the user device application and the server after the use device application obtains connectivity to the server, and purging the off-line lock virtual key from the user device application, the smart lock and the server.

11. The method according to claim 1, further comprises:

maintaining the smart IoT device, which comprises an intrusion detector, an alarm, a temperature and humidity sensor, and a fuel level gauge.

* * * * *